US012703182B2

(12) United States Patent
Hamada

(10) Patent No.: US 12,703,182 B2
(45) Date of Patent: Aug. 11, 2026

(54) LIQUID EJECTION HEAD

(71) Applicant: RISO Technologies Corporation, Tokyo (JP)

(72) Inventor: Akio Hamada, Sunto Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 120 days.

(21) Appl. No.: 18/732,395

(22) Filed: Jun. 3, 2024

(65) Prior Publication Data

US 2025/0083440 A1 Mar. 13, 2025

(30) Foreign Application Priority Data

Sep. 8, 2023 (JP) ................................ 2023-146182

(51) Int. Cl.
*B41J 2/16* (2006.01)
*B41J 2/14* (2006.01)

(52) U.S. Cl.
CPC ....... *B41J 2/14233* (2013.01); *B41J 2/14274* (2013.01); *B41J 2/1612* (2013.01); *B41J 2/1623* (2013.01); *B41J 2/1625* (2013.01); *B41J 2/1631* (2013.01); *B41J 2/1632* (2013.01); *B41J 2/1634* (2013.01); *B41J 2/1643* (2013.01); *B41J 2/1646* (2013.01); *B41J 2002/14491* (2013.01); *B41J 2202/11* (2013.01)

(58) Field of Classification Search
CPC .......... B41J 2/14233; B41J 2002/14491; B41J 2/1612; B41J 2/1623; B41J 2/1625; B41J 2/1631; B41J 2/1632; B41J 2/1634; B41J 2/1643; B41J 2/1646; B41J 2202/11; B41J 2/14274
See application file for complete search history.

(56) References Cited

U.S. PATENT DOCUMENTS

| | | | | |
|---|---|---|---|---|
| 7,651,205 B2 | | 1/2010 | Hayashi | |
| 2009/0189958 A1 | * | 7/2009 | Ogata | B41J 2/14274 347/70 |

FOREIGN PATENT DOCUMENTS

| | | | | | |
|---|---|---|---|---|---|
| JP | 11188879 A | | 7/1999 | |
| JP | H11188880 A | * | 7/1999 | B41J 2/135 |
| JP | 2003094651 A | | 4/2003 | |
| JP | 2003305851 A | | 10/2003 | |
| JP | 2014054820 A | | 3/2014 | |
| JP | 2023046800 A | | 4/2023 | |

OTHER PUBLICATIONS

Extended European Search Report dated Jan. 15, 2025, mailed in counterpart European Application No. 24196602.7, 81 pages.

* cited by examiner

*Primary Examiner* — Yaovi M Ameh
(74) *Attorney, Agent, or Firm* — Kim & Stewart LLP

(57) ABSTRACT

According to an embodiment, a liquid ejection head includes a vibration plate, a nozzle plate with nozzles, a plurality of pressure chambers between the vibration plate and the nozzle plate, and a piezoelectric member on a side of the vibration plate opposite of the pressure chambers. The piezoelectric member includes drive elements in a first area opposed to the pressure chambers via the vibration plate and configured to selectively vibrate the vibration plate to generate pressure changes in the pressure chambers and a plurality of pillar elements in a second area outside the first area and not opposed to the pressure chambers. The vibration plate includes at least one alignment mark at a position opposed to the second area of the piezoelectric member.

18 Claims, 6 Drawing Sheets

LIQUID EJECTION HEAD

CROSS-REFERENCE TO RELATED APPLICATION

This application is based upon and claims the benefit of priority from Japanese Patent Application No. 2023-146182, filed Sep. 8, 2023, the entire contents of which are incorporated herein by reference.

FIELD

The present disclosure relates to a liquid ejection head.

BACKGROUND

In a liquid ejection head, such as an inkjet head, of certain types there can be a vibration plate that is deformed using an actuator that is formed of a piezoelectric material, such as lead zirconate titanate (PZT). The deformation of the vibration plate deforms a pressure chamber adjacent to the vibration plate to eject ink from a nozzle connected to the pressure chamber. In some examples, the liquid ejection head is provided with an actuator including a plurality of drive elements. A flow channel member in which the vibration plate is incorporated or integrated can be used to form a plurality of pressure chambers and flow channels connected to the pressure chambers.

For example, the actuator have grooves formed in piezoelectric material, and a plurality of piezoelectric elements can thus be formed to be parallel to each other. By applying a voltage to a particular piezoelectric element ink can be ejected from a pressure chamber adjacent to the driven element, via the associated vibration plate, since a vibration is applied to the ink in the pressure chamber associated the piezoelectric element. With such a design, it becomes important to accurately align the vibration plate to the pressure chamber and the actuator and to correctly bond the pressure chamber and the actuator to each other.

The present disclosure concerns increasing the positional alignment accuracy between the vibration plate and the actuator.

DETAILED DESCRIPTION

According to one embodiment, a liquid ejection head, includes a vibration plate; a nozzle plate with a plurality of nozzles; a plurality of pressure chambers between the vibration plate and the nozzle plate, the plurality of pressure chambers being connected to the plurality of nozzles; and a piezoelectric member on a side of the vibration plate opposite of the pressure chambers. The piezoelectric member includes a plurality of drive elements in a first area opposed to the plurality of pressure chambers via the vibration plate and configured to selectively vibrate the vibration plate to generate pressure changes in the plurality of pressure chambers and a plurality of pillar elements in a second area outside the first area, the second area is not opposed to the plurality of pressure chambers via the vibration plate. The vibration plate includes an alignment mark at a position opposed to the second area of the piezoelectric member.

Figure 1:
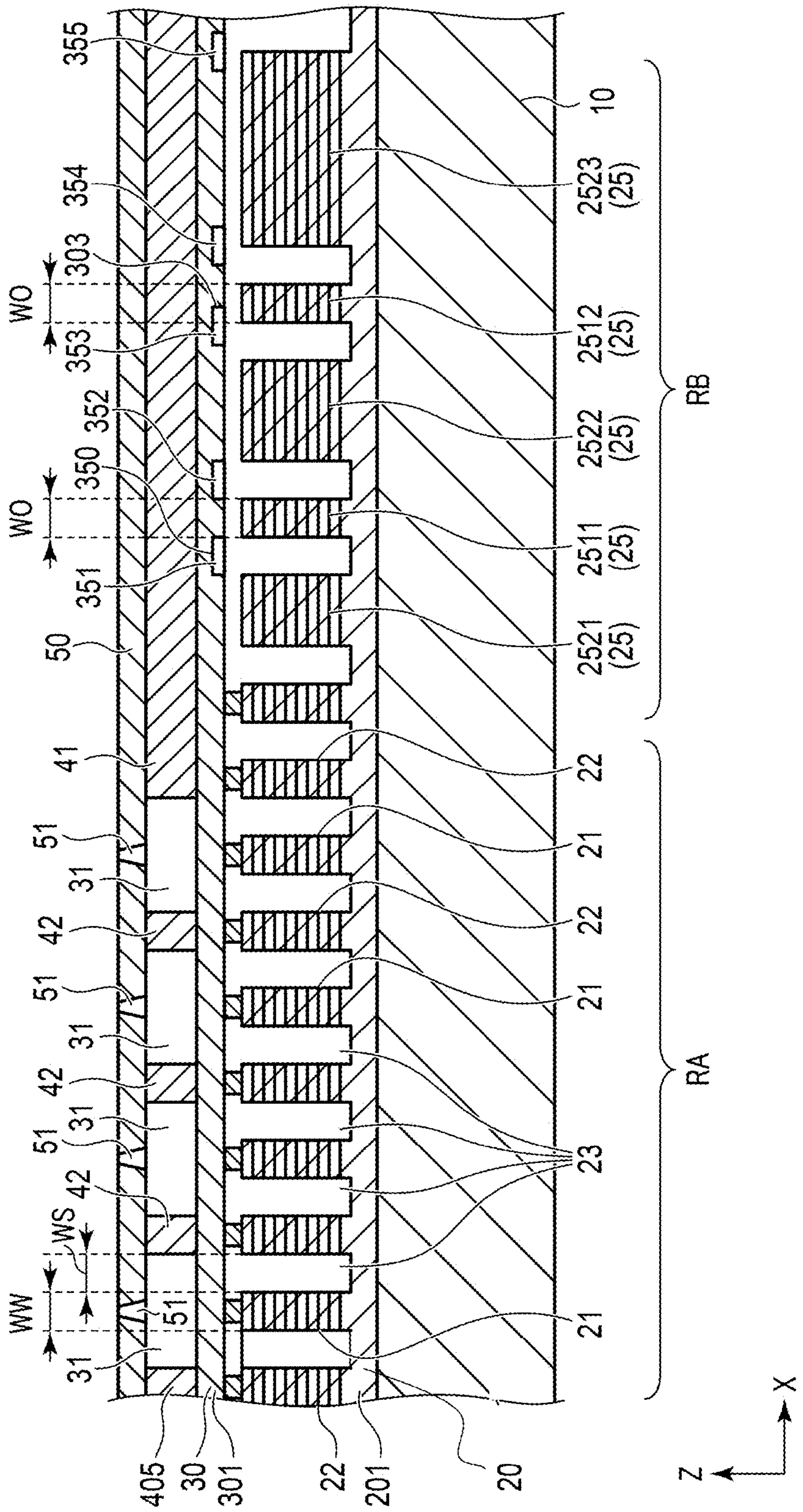
FIG. 1 is a cross-sectional view of an inkjet head according to a first embodiment.
Figure 2:
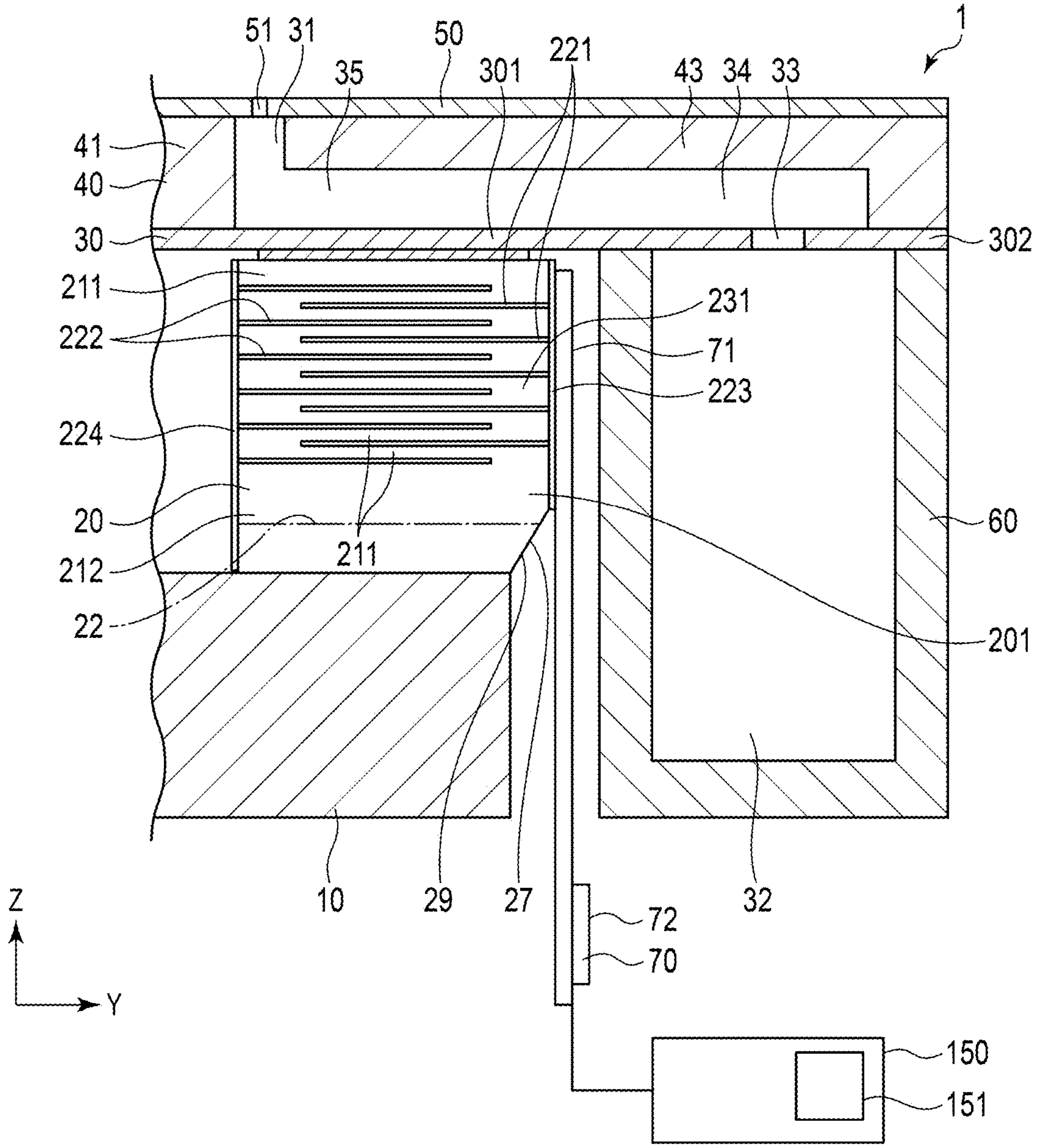
FIG. 2 is another cross-sectional view of an inkjet head according to a first embodiment.
Figure 3:
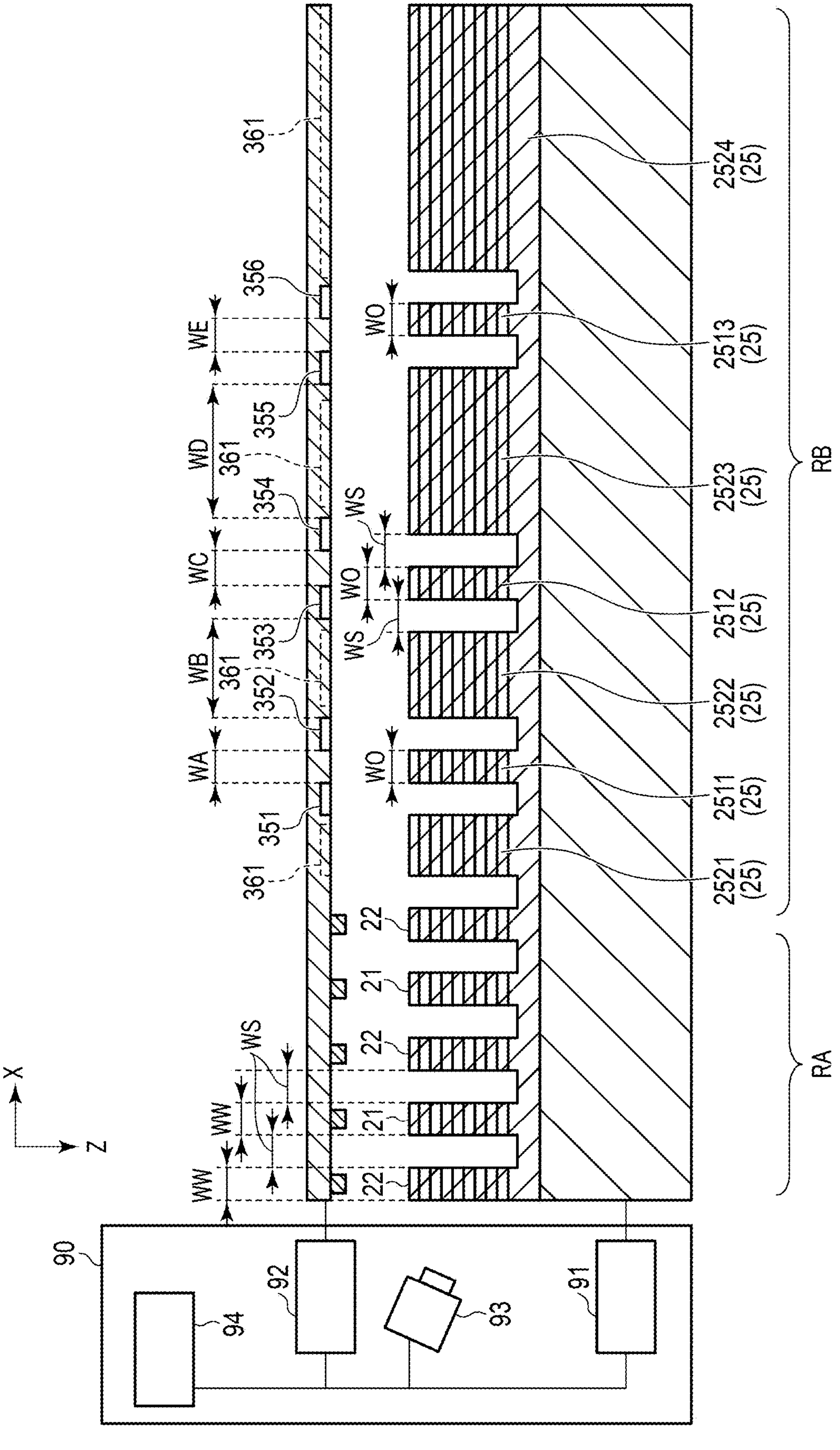
FIG. 3 depicts aspects related to a method of manufacturing an inkjet head.
Figure 4:
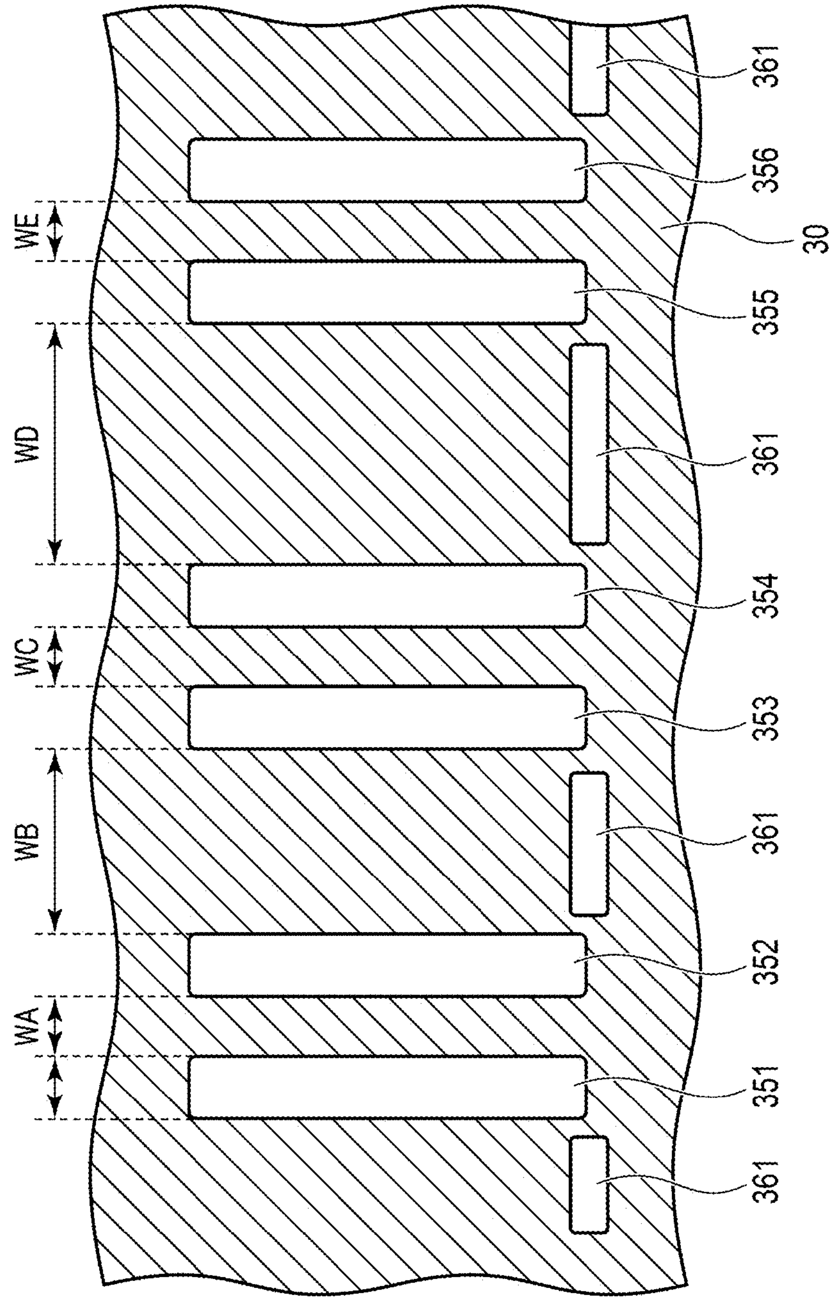
FIG. 4 depicts a position of an alignment mark of a vibrating plate of an inkjet head.
Figure 5:
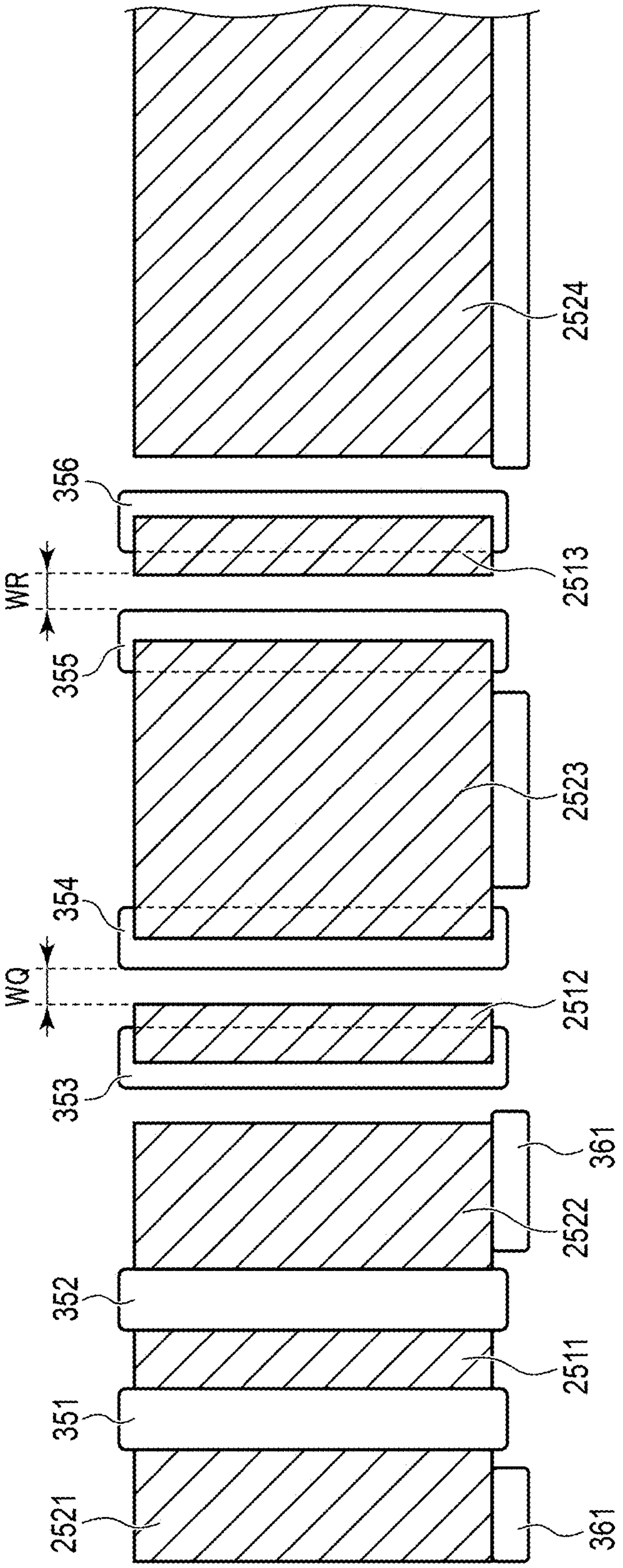
FIG. 5 depicts a positional relationship between an actuator and a vibrating plate of an inkjet head.
Figure 6:
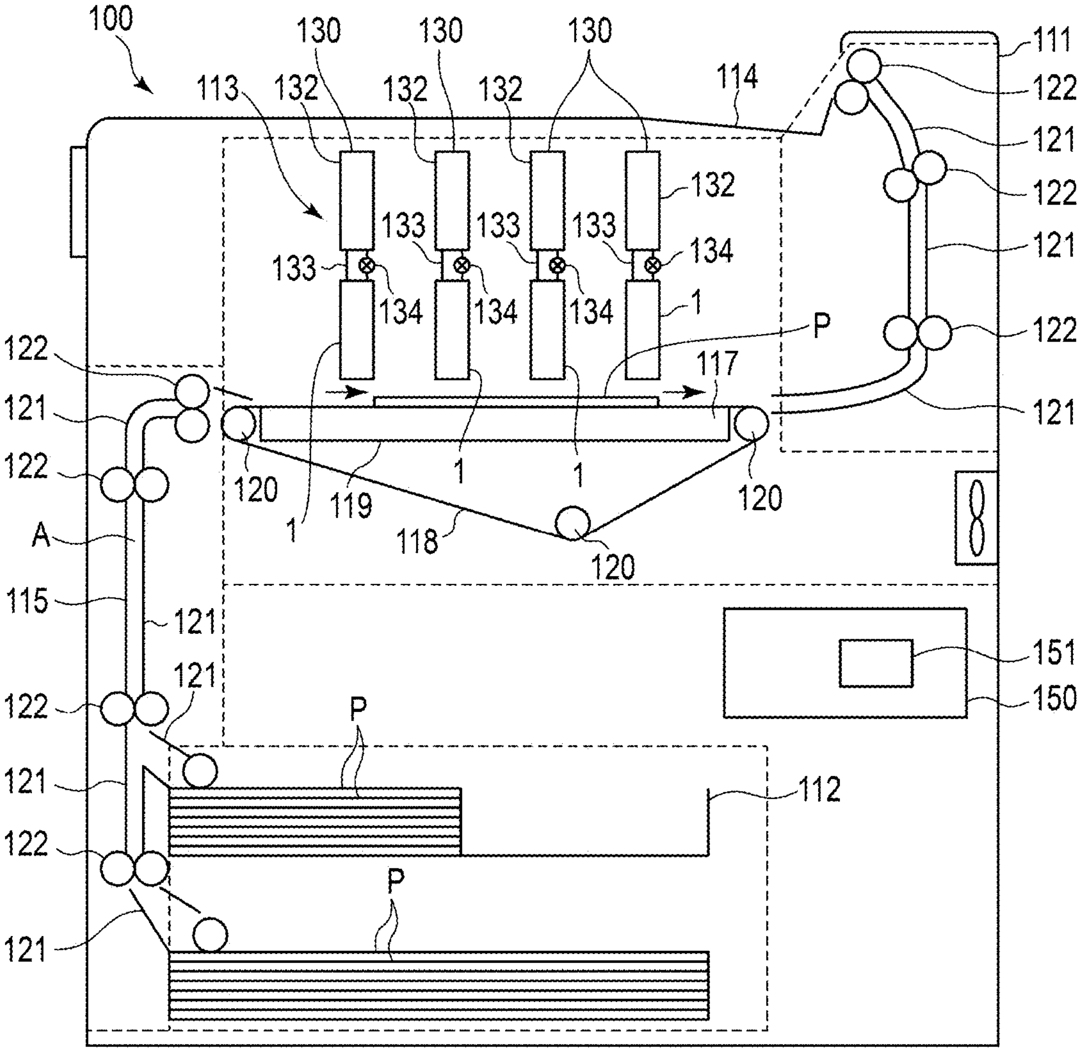
FIG. 6 depicts an inkjet recording device according to a first embodiment.

An inkjet head 1, which is a liquid ejection head, according to the first embodiment and an inkjet recording device 100, which is a liquid ejection device, will be described with reference to FIG. 1 through FIG. 6. FIG. 1 and FIG. 2 are each a cross-sectional view showing aspects of the inkjet head according to the first embodiment. FIG. 3 is an explanatory diagram showing aspects of a method of manufacturing an inkjet head. FIG. 4 is an explanatory diagram showing a position of an alignment mark of a vibrating plate of an inkjet head. FIG. 5 is an explanatory diagram showing a positional relationship between an actuator and a vibrating plate of an inkjet head. FIG. 6 depicts a schematic configuration of an inkjet recording device according to the first embodiment. In general, the drawings are for purposes of explanation, the depicted aspects and components are not necessarily to scale and, as such, aspects or components may be depicted with enlarged or reduced relative dimensions to those in actuality. Furthermore, aspects and/or components may be omitted from certain depictions as appropriate for the sake of convenience of explanation.

As shown in FIG. 1 through FIG. 3, the inkjet head 1 is provided with a base 10, an actuator unit 20, a flow channel member 40, a nozzle plate 50 including a plurality of nozzles 51, a frame unit 60, and a drive circuit 70.

The base 10 has, for example, a rectangular plate shape. A plurality of actuator units 20 may be provided on the base 10. Actuator units 20 are bonded to one side of the base 10.

Each of the actuator units 20 comprises a plurality of piezoelectric elements 21 (driving piezoelectric elements) and a plurality of piezoelectric elements 22 (non-driving piezoelectric elements) which are formed of, for example, layers of piezoelectric materials or the like. The driving piezoelectric elements 21 and non-driving piezoelectric elements are alternately arranged along a direction along the base 10 surface in a row. Pillar elements 25 (for alignment) are arranged at the ends of each row of these piezoelectric elements 21, 22.

In each of the actuator units 20, the plurality of driving piezoelectric elements 21 and the plurality of non-driving piezoelectric elements 22 are arranged in the row direction at constant intervals. The driving piezoelectric elements 21 and the non-driving piezoelectric elements 22 are disposed in a first area RA that will be opposed to a pressure area where the pressure chambers are arranged in the finished device.

In this example, the driving piezoelectric elements 21 and the non-driving piezoelectric elements 22 all have rectangular solid columnar shapes and are all the same in outer shape. Furthermore, at least some of the plurality of pillar elements 25 at the row end portions may have the same columnar shape as the driving piezoelectric elements 21 and the non-driving piezoelectric elements 22.

The pillar elements 25 are disposed in a second area RB which is located outside the first area RA. In the present embodiment, seven pillar elements 25 are disposed at each end of the row, and the second, third, and fourth pillar elements 25 from the center side as the first area RA side are referred to as a first alignment element 2511, a second alignment element 2512, and a third alignment element 2513, and have a columnar shape the same in width (the X direction dimension) as the piezoelectric elements 21, 22. Furthermore, spacing (intervals) between the pillar elements 2511, 2512, and 2513 to adjacent elements (referred together as an alignment target) are the same as between the elements in the first area RA. The first, third, fifth, and seventh spacer elements 2521, 2522, 2523, and 2524 as the rest of the pillar elements 25 are wider (X-direction dimension) than the piezoelectric elements 21, 22 and the alignment elements 2511, 2512, and 2513. In other examples, the first, third, fifth, and seventh spacer elements 2521, 2522, 2523, and 2524 may be the same width as the piezoelectric elements 21, 22 and the alignment elements 2511, 2512, and 2513 or narrower in width than alignment elements 2511, 2512, and 2513.

The actuator unit 20 is divided into a plurality of parts by a plurality of grooves 23, and the plurality of piezoelectric elements 21 and the plurality of piezoelectric elements 22 are all arranged in at the same pitch with grooves 23 of the same width. For the pillar elements 25, the elements 25 adjacent to each other are separated by grooves 23 of the same width. Therefore, any pair of elements 25 adjacent to each other are formed at the same interval as elements in the first area RA.

The plurality of piezoelectric elements 21, 22 and the pillar elements 25 at the ends of the rows may be separated from each other by grooves 23 or by shallower grooves such that adjacent elements may be integrally connected to one another at the base 10 side (groove bottom). For example, when forming the grooves 23 from one side in the stacking direction of a stacked piezoelectric member, by setting the depth of certain grooves 23 to be less than an overall depth in the stacking direction of the stacked piezoelectric member, it is possible to achieve a shape in which the upper end side is divided into a plurality of parts and the lower end side is still connected (continuous).

In the present example, the driving piezoelectric elements 21, the non-driving piezoelectric elements 22, and the pillar elements have a rectangular shape the short-side direction parallel to the row direction (X direction), and the longitudinal direction (Y direction) perpendicular to the row direction and the stacking direction (Z direction) when viewed in a plan view from the stacking direction.

The driving piezoelectric elements 21 are arranged at positions respectively opposed in the stacking direction to the plurality of pressure chambers 31 provided by the flow channel member 40. As an example, the center (middle) position in the X direction and center (middle) position in the extending (Y) direction of the driving piezoelectric element 21 are aligned with the center (middle) position in the row direction and the center (middle) position in the extending (Y) direction of the pressure chamber 31.

The non-driving piezoelectric elements 22 are arranged at positions respectively opposed in the stacking direction to a plurality of partition wall parts 42 provided by the flow channel member 40. As an example, the center (middle) positions in the X direction and the extending (Y) direction of the non-driving piezoelectric element 22 and the center (middle) positions in the X direction and the extending (Y) direction of the partition wall part 42 are aligned in the stacking direction.

The pillar elements 25 can be formed by performing groove processing on the both end portions when forming the piezoelectric elements 21, 22 of the actuator. The pillar elements 25 can also be formed at the both ends in the longitudinal direction of the actuator. It may be desirable to form the pillar elements 25 at positions which do not overlap a wiring film 71 (wiring member) that is eventually directly mounted on a piezoelectric member 201.

The piezoelectric elements 21, 22 and the pillar elements 25 have, for example, the same stacked layer structure. A part of the pillar element 25 may be a structure sandwiched by a manifold 405 and the base 10.

In an actuator unit 20, by performing dicing processing on a stacked type piezoelectric material bonded in advance to the base 10 from an upper surface opposite from the base 10 side to form the grooves 23, a plurality of piezoelectric elements having rectangular columnar shapes can be formed at predetermined intervals. Furthermore, electrodes and so on are provided for the plurality of columnar elements thus formed, and the plurality of driving piezoelectric elements 21 and the plurality of non-driving piezoelectric elements 22 can thus be arranged alternately, and the plurality of pillar elements 25 can also be formed. The driving piezoelectric elements 21 and the non-driving piezoelectric elements 22 are alternately arranged in parallel to each other across a groove 23. Similarly, the adjacent pillar elements 25 can be arranged in parallel to each other across a groove 23.

For example, the stack type piezoelectric member 201 used for forming the actuator unit 20 is formed by stacking piezoelectric material sheets, and then sintering the piezoelectric materials (sheets).

The piezoelectric member used for forming the driving piezoelectric elements 21, the non-driving piezoelectric elements 22, and the pillar elements 25 is, for example, a stacked piezoelectric body. The driving piezoelectric element 21, the non-driving piezoelectric element 22, and the pillar element 25 are each thus provided with a plurality of piezoelectric body layers 211 stacked on one another and internal electrodes 221, 222 formed on principal surfaces of each of the piezoelectric body layers 211. It should be noted that, as an example, the driving piezoelectric element 21, the non-driving piezoelectric element 22, and the pillar element 25 have the same stacked structure. The driving piezoelectric element 21 and the non-driving piezoelectric element 22 are provided with external electrodes 223, 224 formed on a surface thereof.

The piezoelectric body layer 211 is formed of the piezoelectric material such as a lead zirconate titanate (PZT) based piezoelectric material or a lead-free potassium sodium niobate (KNN) based piezoelectric material to have a thin plate shape. The piezoelectric body layers 211 are stacked so that the thickness direction is parallel to the stacking direction (Z direction). The layers are bonded to each other.

The internal electrodes 221, 222 are conductive films formed of a conductive material which can be sintered such as silver-palladium to have a predetermined shape. The internal electrodes 221, 222 are formed in a predetermined area on the principal surface of each of the piezoelectric body layers 211. The internal electrodes 221, 222 are different in polarity from each other. For example, the internal electrode 221 is formed in an area which reaches one of end of the piezoelectric body layer 211 in the Y direction (extending direction) but does not reach the other of the end of the piezoelectric body layer 211 in the Y direction). The internal electrode 222 is formed at the other end of the piezoelectric body layer 211 from the internal electrode 222 but does not reach all the way to the opposite end of the piezoelectric body layer 211 in the Y direction. The internal electrodes 221, 222 are respectively coupled to the external electrodes 223, 224 formed on side surfaces of the piezoelectric elements 21.

The stacked piezoelectric member constituting the driving piezoelectric element 21, the non-driving piezoelectric element 22, and the pillar element 25 can be further provided with a dummy layer 212 at the base 10 side and/or the nozzle plate 50 side. The dummy layers 212 can be formed of the same material as the piezoelectric body layer 211. A dummy layer 212 has an electrode at just one side, and is therefore not subjected to an electric field being applied across the layer, and is therefore not deformed during operations. For example, the dummy layer 212 does not function as a piezoelectric body, and serves as a base layer permitting fixing of the actuator unit 20 to the base 10 or provides a polishing margin to be used for achieving dimensional accuracy or the like during device assembly or after the assembly.

The external electrodes 223, 224 are formed on the surfaces of the plurality of piezoelectric elements 21 and connect to end portions of the internal electrodes 221, 222. For example, the external electrodes 223, 224 are respectively formed on opposite end surfaces of the piezoelectric body layer 211. The external electrodes 223, 224 can be formed of deposited metal such as nickel (Ni), chromium (Cr), gold (Au) or the like using methods such as a plating method or a sputtering method. The external electrode 223 and the external electrode 224 are different in polarity from each other. The external electrode 223 and the external electrode 224 are disposed on respective side surface parts different from each other. In some examples, the external electrodes 223, 224 may be laid out differently from each other but on the same side surface of the driving piezoelectric elements 21.

In the present embodiment, the external electrode 223 is used as an individual electrode, and the external electrode 224 is used as a common electrode. The external electrodes 223 have electrode layers divided (separated) by the grooves 23, and are arranged to be independently addressable from each other. The external electrodes 224 forming the common electrode comprise a continuous electrode layer, and are, for example, grounded. The external electrodes 223, 224 are coupled to the drive circuit 70 via an FPC 71 (a wiring member, such as a flexible printed circuit board) including wiring lines (charge supplying paths). For example, each of the external electrodes 223, 224 is coupled to a control unit 150 via a driver IC 72 of the drive circuit 70 by the FPC 71, and is configured so as to be able to be subjected to drive control under the control of the processor 151. It should be noted that the arrangement of the common electrode and the individual electrodes may be reversed in other examples.

By a voltage being applied to the internal electrodes 221, 222 via the external electrodes 223, 224, the driving piezoelectric element 21 longitudinally vibrates along the stacking direction of the piezoelectric body layer 211. The longitudinal vibration mentioned here refers to a "vibration in the thickness direction defined by a piezoelectric constant d33." The driving piezoelectric element 21 displaces the vibrating plate 30 (vibration plate) with the longitudinal vibration to deform the pressure chamber 31. In other words, the driving piezoelectric element 21 generates a pressure change in the pressure chamber 31.

The flow channel member 40 is provided with the vibrating plate 30 disposed at one side of the actuator unit 20 in the stacking direction and a manifold 405 stacked on one side of the vibrating plate 30.

The vibrating plate 30 is disposed between the manifold 405 and the actuator unit 20 in the stacking direction. The vibrating plate 30 forms the flow channel member 40 together with the manifold 405.

The vibrating plate 30 extends along a plane perpendicular to the stacking direction, and is bonded to a surface at one side in the stacking direction, namely the nozzle plate 50 side, of the piezoelectric body layer 211 of the plurality of piezoelectric elements 21, 22. The vibrating plate 30 is configured, for example, so as to be able to deform. The vibrating plate 30 is bonded to the driving piezoelectric elements 21 and the non-driving piezoelectric elements 22, and the pillar elements 25 of the actuator unit 20, and the frame unit 60. For example, the vibrating plate 30 includes a vibration area 301 opposed to the piezoelectric elements 21, 22, a support area 302 opposed to the frame unit 60 in at least one end portion in the Y direction of the vibration area 301, and an alignment area 303 opposed to the pillar elements 25 at the both ends in the arrangement direction of the vibration area 301.

The vibration area 301 has a plate shape disposed so that, for example, the thickness direction becomes the stacking direction of the piezoelectric body layers 211. The vibrating plate 30 extends in the arrangement direction of the plurality of driving piezoelectric elements 21 and the plurality of non-driving piezoelectric elements 22. The vibrating plate 30 is, for example, a metal plate. The vibrating plate 30 may include a plurality of vibrating regions which are opposed to the respective pressure chambers 31, and which may individually be displaced. The vibrating plate 30 can be formed of a plurality of vibrating regions joined integrally to each other.

As an example, the vibrating plate 30 is formed of an stainless steel (SUS) plate, and is configured to have a thickness in a range from 5 μm to 15 μm. It should be noted that in the vibration area 301, a crease, a step, or a convexo-concave may be formed in a region adjacent to the vibrating region or between the vibrating regions adjacent to each other so as to facilitate the displacement of the plurality of vibrating regions. A region disposed so as to be opposed to the driving piezoelectric element 21 is displaced due to expansion and contraction of the driving piezoelectric element 21, and thus, the vibration area 301 deforms. For example, the vibrating plate 30 may be required to have an extremely thin and complicated shape, and therefore may be formed by an electroforming method or the like in some cases. The vibrating plate 30 is joined to an upper end surface of the actuator unit 20 by bonding.

The support area 302 is a plate-like member disposed between the frame unit 60 and the manifold 405. The support area 302 includes a communication part having a through hole connected to a common chamber 32. For example, the communication part is provided with a filter through which the liquid can pass.

The alignment area 303 is a region opposed to the second area RB where the plurality of pillar elements 25 is formed, and an alignment part 350 including alignment marks 351 through 356, and 361 for alignment is disposed in the alignment area 303.

For example, the alignment part 350 includes a plurality of main marks (e.g., main marks 351, 352, 353, 354, 355,356) disposed at both row ends along with sub-marks 361 at one end side in the extending (Y) direction.

The main marks 351 through 356 and the sub-marks 361 are indexes (indicators) which can be recognized with a camera or visually when the actuator unit 20 is being bonded to the vibrating plate 30 in alignment with each other. The main marks 351 through 356 and the sub-marks 361 are formed as openings or grooves.

The main marks 351 through 356 and the sub-marks 361 can be through holes or recesses provided to the vibrating plate 30. The main marks 351 through 356 and the sub-marks 361 form indexes used for optically detecting the positional relationships to the pillar elements 25.

The main marks 351 through 356 and the sub-marks 361 are positioned so as to be opposed to the second area RB where the pillar elements 25 are arranged, and the overlapping accuracy between the actuator unit 20 and the vibrating plate 30 is detected based on the positional relationships between the alignment marks 351 through 356 and the pillar elements 25. In an example, the alignment marks 351 through 356 are each a through hole in the vibrating plate and thus are open to permit viewing to underlying pillar elements 25 or the like.

The main marks 351 through 356 and the sub-marks 361 are used for detecting the overall positional relationship between the actuator unit 20 and the vibrating plate 30. Six main marks 351 through 356 are formed, for example, side by side to each other at each end of the vibration area 301 in the X direction. The main marks 351 through 356 may be the same shape as each other or different in shape from each other. The positional accuracy may be judged or detected based on a positional relationship being such that the main marks 351 through 356 are positioned in a zone in which the plurality of pillar elements 25 are viewable in the stacking direction, only some of plurality of pillar elements 25 being viewable, or that none are viewable.

In the present embodiment, any of the main marks 351 through 356 overlap any of the plurality of pillar elements 25, and any of the marks 351 through 356 partially overlap any of the plurality of pillar elements 25.

The sub-marks 361 each include an edge portion in alignment with an end edge at one side in the extending direction of the pillar element 25, and extend along the arrangement direction. As an example, in the present embodiment, the sub-marks 361 are formed only at one end in the extending direction of the vibration area 301. It should be noted that the configurations of the plurality of sub-marks 361 may be the same shape as each other or different in shape from each other. For example, the sub-marks 361 are disposed so as to be opposed to one edge in the extending direction of the driving element and the plurality of pillar elements 25, or so as to be adjacent thereto without a gap when viewed from the stacking direction. In other words, in the alignment described later, gaps in the extending direction between the sub-marks 361 and the plurality of pillar elements 25 are detected.

The positional relationship between the arrangement of the alignment marks 351 through 356, 361 at one side in the arrangement direction as the longitudinal direction of the actuator unit 20, and the plurality of pillar elements 25 will be described with reference to FIG. 3 through FIG. 5. It should be noted that in each of the drawings, there are shown the arrangement of the alignment marks 351 through 356, 361, and the plurality of pillar elements 25 arranged at one side of a longitudinal end portion of the actuator.

As shown in FIG. 3 through FIG. 5, in the present embodiment, at the actuator unit 20 side, in the arrangement direction, at each side in the first area RA, the seven pillar elements 25 are arranged, and among these, the second, fourth, sixth pillar elements 25 from the first area RA side are defined as the alignment elements 2511, 2512, and 2513, respectively. The first, third, fifth, and seventh pillar elements 25 from the first area RA side are defined as the spacer elements 2521, 2522, 2523, and 2524, respectively. The width WO as a dimension in the arrangement direction of the alignment elements 2511, 2512, and 2513 is set to be equivalent to the width WW as a dimension in the arrangement direction of the piezoelectric elements 21, 22, and the width of the spacer elements 2521, 2522, 2523, and 2524 is larger than the width WO of the piezoelectric elements 21, 22.

In contrast, at the vibrating plate 30 side, three pairs of main marks (six total main marks), namely first through sixth main marks 351 through 356, are formed in the arrangement direction. Further, each of the marks 351 through 356, 361 are arranged at each of the both end portions opposed to the second areas RB at both sides in the arrangement direction, and the shapes and the arrangements become symmetric about the center, namely reverse from each other. In other words, the main marks 351 through 356 have the arrangement in which the main marks 351 through 356 are sequentially arranged side by side from the first area RA side toward the outside.

These main marks 351 through 356 are all the same in width and are configured to have a rectangular shape elongated in the Y direction. For example, the width in the X direction of each of the main marks 351 through 356 is less than the width WW of the driving piezoelectric elements 21, the non-driving piezoelectric elements 22 and the pillar elements 2511, 2512, and 2513.

Further, a width (a first width) WA of a distance between the first main mark 351 and the second main mark 352, a width (a third width) WC of a distance between the third main mark 353 and the fourth main mark 354, and a width (a fifth width) WE of a distance between the fifth main mark 355 and the sixth main mark 356 as the three pairs are the same as a width of the alignment elements 2511, 2512, and 2513 to be the target of the alignment. Further, the widths WA, WC, and WE are configured to be smaller than the width WS of the grooves 23 as the pitch between the elements 21, 22, and 25.

In contrast, a width (a second width) WB between the second main mark 352 and the third main mark 353, and a width (a fourth width) WD between the fourth main mark 354 and the fifth main mark 355 are larger than the widths WA, WC, and WE.

In the present embodiment, at least one of the pillar elements 25 is disposed at a position opposed to an area between the pair of alignment marks as any one of the three pairs. Specifically, the first alignment element 2511 is disposed in, for example, a region of the first width WA between the first main mark and the second main mark.

Further, in the present embodiment, the rest of the pillar elements are arranged so that the edges are opposed to any of the alignment marks. For example, the edge at a center side of the alignment element 2512 is opposed to the third main mark 353, and is disposed so as to overlap the third main mark 353. Meanwhile, the edge at an outer side of the alignment element 2513 is opposed to the sixth main mark 356, and is disposed so as to overlap the sixth main mark 356. It should be noted that the sub-mark 361 in the Y direction (the short-side direction of the actuator) may be disposed so as to overlap the main marks 351 through 356. It should be noted that the alignment marks 351 through 356, 361 are integrally formed when forming the vibrating plate 30, or formed with a laser or the like after bonding the vibrating plate 30 and the manifold 405.

The manifold 405 is disposed between the nozzle plate 50 and the vibrating plate 30 in the stacking direction. The manifold is bonded at one side in the stacking direction of the vibrating plate 30.

The manifold 405 is disposed between the nozzle plate 50 and the vibrating plate 30. Inside the manifold 405, there is formed a predetermined ink flow channel 35 (a liquid flow channel) including the plurality of pressure chambers 31, a common flow channel 33 connected to the common chamber 32, and a plurality of individual flow channels 34 which reach the pressure chambers 31 from the common flow channel 33. For example, the manifold 405 has a peripheral wall part 41 surrounding the ink flow channel 35 (a liquid chamber) partition wall parts 42 (flow channel pillars) which partition the plurality of pressure chambers 31, and side wall parts 43 which partition the plurality of individual flow channels 34. The manifold 405 may be formed of multiple flow channel members stacked on one another. There may be adopted a configuration in which, for example, in the manifold 405, flow channel substrates are stacked on one another with openings shaped like slits or the like, to form portions of the ink flow channel 35.

One side of the manifold 405 is bonded to the vibrating plate 30.

The pressure chambers 31 are spaces formed on one side by the vibration area 301 of the vibrating plate 30. Each of the pressure chambers 31 communicates (is connected to) a nozzle 51 provided in the nozzle plate 50. The nozzle plate 50 is on the opposite side of the pressure chamber 31 from the vibrating plate 30.

The pressure chambers 31 are connected to the common chamber 32 via the communication part passing through the individual flow channels 34 and the common flow channel 33. The pressure chamber 31 holds the liquid supplied from the common chamber 32 and ejects the liquid from the nozzle 51 in response to the deformation of the vibrating plate 30 due to the vibration.

The partition wall part 42 is a wall-like member which partitions the plurality of pressure chambers 31 in the arrangement direction. The partition wall part 42 is disposed so as to be opposed to the non-driving piezoelectric element 22 via the vibrating plate 30, and is supported by the non-driving piezoelectric element 22. The plurality of partition wall parts 42 is disposed at the same pitch as the pitch at which the plurality of pressure chambers 31 is arranged.

The side wall part 43 is a wall-like member which partitions the individual flow channels 34. For example, a side wall part 43 is disposed at an entrance of a pressure chamber 31. The side wall part 43 is configured so that the individual flow channel 34 becomes higher in flow channel resistance (e.g., narrower) than the inside of the pressure chamber 31, and the individual flow channel 34 becomes smaller in flow channel cross-sectional area than the inside of the pressure chamber 31. The plurality of side wall parts 43 is disposed at the same pitch as the pitch at which the plurality of pressure chambers 31 is arranged.

The nozzle plate 50 is formed like a rectangular plate which is made of metal such as a stainless steel (SUS) alloy such as SUS-Ni or a resin material such as polyimide, which has a thickness of about 10 μm to 100 μm. The nozzle plate 50 is disposed at one side of the manifold 405 so as to cover the opening at one side of the pressure chamber 31.

The plurality of nozzles 51 is arranged in the same arrangement direction (the first direction) as the arrangement direction of the pressure chambers 31 to form the nozzle array. For example, the nozzles 51 are disposed in two rows, and the nozzles 51 are respectively disposed at positions corresponding to the pressure chambers 31. In the present embodiment, the nozzles 51 are respectively disposed at positions near an end portion in the extending direction of the pressure chambers 31. For example, the positions of the nozzles 51 in one of the rows and the positions of the nozzles 51 in the other of the rows are arranged so as to alternately be shifted from each other in a zigzag arrangement.

The frame unit 60 is a structure to be bonded to the vibrating plate 30 together with the piezoelectric elements 21, 22 and the pillar elements 25. The frame unit 60 is disposed adjacent to the actuator unit 20 in the present embodiment. The frame unit 60 forms a outer contour of the inkjet head 1. The frame unit 60 may be used to form flow channels for the liquid. In the present embodiment, the frame unit 60 is bonded to the vibrating plate 30, and common chamber 32 is formed between the frame unit 60 and the vibrating plate 30.

The common chamber 32 is formed inside the frame unit 60, and connects to each of the pressure chambers 31 through the communication part, the common flow channel 33, and the individual flow channels 34 provided to the vibrating plate 30.

The drive circuit 70 is provided with a wiring film 71, one end of which is coupled to the external electrodes 223, 224. A driver IC 72 of the drive circuit 70 is mounted on the wiring film 71. A printed wiring board is mounted on the other end of the wiring film 71.

The drive circuit 70 applies the drive voltages to the external electrodes 223, 224 with the driver IC to thereby drive the driving piezoelectric elements 21 as necessary for printing or the like. When driven the piezoelectric elements increase and/or decrease the volumes of the pressure chambers 31 for ejecting droplets from the nozzles 51.

The wiring film 71 is coupled to the external electrodes 223, 224. For example, the wiring film 71 is an anisotropically-conductive film (ACF) fixed to coupling portions of the external electrodes 223, 224 by thermocompression bonding. The wiring film 71 is, for example, a chip on film (COF) on which the driver IC 72 is mounted.

The driver IC 72 is coupled to the external electrodes 223, 224 via the wiring film. It should be noted that the driver IC 72 may be coupled to the external electrodes 223, 224 by other means such as an anisotropically-conductive paste (ACP), a nonconductive film (NCF), or a nonconductive paste (NCP) instead by the wiring film 71.

The driver IC 72 generates control signals and drive signals for making the piezoelectric elements 21 operate. The driver IC 72 generates the control signals for control such as selecting the timing of ejecting the ink and selectively driving piezoelectric elements 21 which eject the ink in accordance with an image signal input from the control unit 150 of the inkjet recording device 100. Further, the driver IC 72 generates the voltages to be applied to the driving piezoelectric elements 21, namely the drive signals (electric signals), in accordance with the control signals. When the driver IC 72 applies the drive signal to the driving piezoelectric element 21, the driving piezoelectric element 21 displaces the vibrating plate 30 to change the volume of the pressure chamber 31. Thus, a pressure vibration occurs in the ink with which the pressure chamber 31 is filled. Due to the pressure vibration, the ink is ejected from the nozzle 51 of the pressure chamber 31. It should be noted that it is possible for the inkjet head 1 to be able to realize gradation (grayscale) expression by changing an amount (size or volume) of an ink droplet to be landed for each pixel. Further, it is possible for the inkjet head 1 to be able to change the number of droplets ejected for each pixel. As described above, the driver IC 72 is an example of an application unit for applying the drive signals to the driving piezoelectric elements 21.

For example, the driver IC 72 is provided with a data buffer, a decoder, and drivers. The data buffer saves the print data for each of the driving piezoelectric elements 21 in a time-series manner. The decoder controls drivers based on the print data in the data buffer for each of the driving piezoelectric elements 21. The drivers output the drive signals for making the respective driving piezoelectric elements 21 operate based on the control of the decoder. The drive signals are, for example, voltages to be applied to the respective driving piezoelectric elements 21.

The printed wiring board can be a printing wiring assembly (PWA) on which a variety of electronic components and connectors are mounted. The printed wiring board is coupled to the control unit 150 of the inkjet recording device 100.

In the inkjet head 1 configured as described above, the ink flow channel including the pressure chambers 31 connected to the nozzles 51, the individual flow channels 34, the common flow channel 33, and the common chamber 32 is formed by the combination of the nozzle plate 50, the frame unit 60, the manifold 405, and the vibrating plate 30. For example, the common chamber 32 is connected to a cartridge (ink reservoir), and the ink is supplied to the pressure chambers 31 through the common chamber 32. All the driving piezoelectric elements 21 are coupled with wiring lines so that the voltages can be applied to the driving piezoelectric elements 21. In the inkjet head 1, when the control unit 150 applies the drive voltage to the electrodes 221, 222 via the driver IC, the driven piezoelectric element vibrates in the stacking direction (the Z direction), namely the thickness direction of the piezoelectric body layers 211. In other words, the driving piezoelectric element 21 makes a longitudinal vibration.

Specifically, the control unit 150 applies the drive voltage to the internal electrodes 221, 222 of the driven piezoelectric element 21 selectively to drive the driving piezoelectric element 21. Then, the deformation in a tensile direction and the deformation in a compression direction due to the driven piezoelectric element 21 are combined with each other to deform the vibrating plate 30 to change the volume of the pressure chamber 31 to thereby introduce (draw in) the liquid from the common chamber 32, and then eject the liquid from the nozzle 51.

An example of a method of manufacturing the inkjet head 1 according to the present embodiment will be described with reference to FIG. 3. First, the internal electrodes 221, 222 are formed from the piezoelectric material sheets using a print processing. Then, a plurality of piezoelectric body layers 211 having the internal electrodes 221, 222 is stacked, and a calcination treatment is performed to form the stacked piezoelectric member. Then, the stacked piezoelectric member (in which the internal electrodes 221, 222 have been provided) is placed on the base 10.

Subsequently, the external electrodes 224 are formed on the stacked piezoelectric member with print processing (e.g., lithography). The plurality of grooves 23 are formed at a predetermined pitch by a dicing processing or the like to divide the stacked piezoelectric member into a plurality of parts to thereby form the plurality of columnar elements for the piezoelectric elements 21, 22 and the pillar elements 25.

A polarization treatment of the plurality of columnar elements is performed at this time, and then the wiring board is coupled to the external electrodes 224 with soldering. The driving piezoelectric elements 21, the non-driving piezoelectric elements 22, and the pillar elements 25 are thus formed with spacing between adjacent elements being the same Then, the vibrating plate 30, the manifold 405, and the nozzle plate 50 are stacked on the actuator unit 20 in alignment with each other and bonded together by bonding materials therebetween or the like. Then, the frame unit 60 is disposed on the periphery of the actuator unit 20, and then these various components are bonded to each other.

By incorporating alignment marks 351 through 356, 361 and the arrangement of the alignment elements 2511, 2512, and 2513 these marks/elements can be positioned so as to be opposed to each other in the stacking direction. Alignment can then be visually or optically determined by detecting the positions of the alignment marks 351 through 356, 361 and the positions of the alignment elements 2511, 2512, and 2513 using an optical detection unit such as a camera, and then adjusting the positions, it is possible to achieve accurate alignment of the actuator unit 20 and the vibrating plate 30.

For example, a bonding device 90 is provided with moving devices 91, 92 which moveable support a vibrating plate 30 and flow channel member 40 together and an actuator unit 20, the vibrating plate 30 and the flow channel member 40 and the actuator unit 20 can be relatively positioned to each other. The bonding device 90 also includes a detection unit 93 such as an optical sensor for optically detecting the positional relationship between the alignment marks 351 through 356, 361 and the alignment elements 2511 to 2513. A control unit 94 is provided for controlling the moving devices 91, 92 based on the detection result.

The control unit 94 includes a controller such as a CPU, and performs drive control on the moving devices 91, 92 to move the set of the vibrating plate 30 and the flow channel member 40 relative to the actuator unit 20 to achieve the alignment. Further, the control unit 94 controls the detection unit 93 at a predetermined timing interval during the movement to detect the positional relationship between the alignment marks 351 through 356, 361 and the alignment elements 2511 to 2513. It should be noted that the detection unit 93 can be an imaging device such as a camera and detects or otherwise provides positional information. For example, the detection unit 93 has an oblique optical axis, and takes an image from obliquely outside the parts being aligned when performing the alignment processing. The detection unit 93 detects the positions of the alignment marks 351 to 356, 361, and the pillar elements 25.

The control unit 94 drives the moving devices 91, 92 based on the detection result (information) from the detection unit 93 to perform the alignment.

For the alignment, the control unit 94 adjusts the positions so that, for example, the first alignment element 2511 is disposed between the first main mark 351 and the second main mark 352 in the second areas RB at both ends in the longitudinal direction.

Further, the control unit 94 performs alignment so that the inner edges of the pair of alignment elements 2512 overlap the third alignment mark 353, and the outer edge of the third alignment element 2513 is opposed to the sixth alignment mark 356.

The control unit 94 detects a size of a gap WQ between the outer edge of the second alignment element 2512 and the fourth main mark 354 and a gap WR between the inner edge of the third alignment element 2513 and the fifth main mark 354 in each of the second areas RB, and then performs alignment for making these gaps equal to each other or the dimensional difference becomes equal to or less than some predetermined value.

The control unit 94 performs the alignment so that the sub-marks 361 and offends of the elements 25 are opposed or close to each other. For example, the control unit 94 performs the alignment so that the gaps between the edges of the elements 25 and the sub-marks 361 become equal to or less than a predetermined value.

When the alignment is completed, the vibrating plate 30 and the actuator unit 20 are then bonded to each other.

By adopting such a configuration, it is possible to ensure the bonding accuracy between the actuator and the vibrating plate.

An example of the inkjet recording device 100 equipped with the inkjet head 1 will be described with reference to FIG. 6. The inkjet recording device 100 is provided with a chassis 111, a medium supply unit 112, an image forming unit 113, a medium discharge unit 114, a conveyance device 115, and the control unit 150.

The inkjet recording device 100 is a liquid ejection device which ejects a liquid such as ink while conveying a sheet P or the like as a print medium or an ejection target along a predetermined conveyance path A from the medium supply unit 112 to the medium discharge unit 114 passing through the image forming unit 113.

The chassis 111 constitutes the outer contour of the inkjet recording device 100. A discharge opening for discharging the sheet P outside is disposed at a predetermined position of the chassis 111.

The medium supply unit 112 is provided with a plurality of paper cassettes, and is configured to be able to hold a plurality of sheets P of a variety of sizes in a stacked manner.

The medium discharge unit 114 is provided with a catch tray configured to be able to hold the sheet P discharged from the discharge opening.

The image forming unit 113 is provided with a support unit 117 for supporting the sheet P and a plurality of head units 130 disposed above the support unit 117.

The support unit 117 includes a conveyance belt 118 in a loop shape, a support plate 119 for supporting the conveyance belt 118, and a plurality of belt rollers 120.

When forming the image, the support unit 117 supports the sheet P on an upper surface of the conveyance belt 118, and feeds the conveyance belt 118 at a predetermined timing by rotation of the belt rollers 120 to thereby convey the sheet P downstream.

The head units 130 are respectively provided for inkjet heads 1 for four colors, ink tanks 132 are respectively mounted on the inkjet heads 1, coupling flow channels 133 are provided for respectively coupling the inkjet heads 1 to the ink tanks 132 along with supply pumps 134.

In the present embodiment, inkjet heads 1 for four colors, namely cyan, magenta, yellow, and black, and the ink tanks 132 for containing the ink of these colors are provided. The ink tanks 132 are coupled to the inkjet heads 1 with the coupling flow channels 133.

The ink tanks 132 are connected to negative pressure control devices such as pumps. By performing negative pressure control on the inside of the ink tank 132 with the negative pressure control device in accordance with hydraulic head values of the inkjet head 1 and the ink tank 132, an ink (liquid) meniscus having a predetermined shape is provided for each of the nozzles 51 of the inkjet head 1.

The supply pumps 134 are each a liquid feeding pump such as a piezoelectric pump. The supply pumps 134 are disposed in the supply flow channels. The supply pumps 134 are coupled to the drive circuit of the control unit 150 with wiring, and are configured to be able to be controlled by a central processing unit (CPU) or the like. The supply pumps 134 each supply an inkjet head 1 with liquid.

The conveyance device 115 conveys the sheet P along the conveyance path A from the medium supply unit 112 to the medium discharge unit 114 through the image forming unit 113. The conveyance device 115 is provided with a plurality of guide plate pairs 121 and a plurality of conveying rollers 122 arranged along the conveyance path A.

The guide plate pairs 121 are a pair of plate members arranged so as to be opposed to each other and guide the sheet P therebetween along the conveyance path A.

The conveying rollers 122 are driven by the control unit 150 to rotate to thereby feed a sheet P downstream along the conveyance path A. It should be noted that sensors for detecting conveyance state of the sheet can be arranged at a variety of places on the conveyance path A.

The control unit 150 can be a control circuit such as a CPU or other controller, a read only memory (ROM) for storing a variety of programs, data, and so on, a random access memory (RAM) for temporarily storing a variety of variable data, image data, and so on, and an interface unit for handling data communication from and to the outside, such as an external computer terminal or the like.

In the inkjet recording device 100, when the control unit 150 receives a print instruction by user operation of an operation input unit or via interface, the control unit 150 drives the conveyance device 115 to convey the sheet P, and outputs print signals to the head units 130 to thereby drive the inkjet heads 1. As the ejection operation, the inkjet head 1 transmits the drive signal to the driver IC 72 using the image signal according to the image data to apply the drive voltage to the internal electrodes 221, 222 to selectively drive the driving piezoelectric element 21 as the ejection target to make the longitudinal vibration in the stacking direction to change the volume of the pressure chamber 31 to thereby eject the ink from the nozzle 51 to form the image on the sheet P held on the conveyance belt 118. Further, as the liquid ejection operation, the control unit 150 drives the supply pumps 134 to thereby supply the ink from the ink tanks 132 to the common chambers 32 of the inkjet heads 1, respectively.

Here, a drive operation of driving the inkjet head 1 will be described. The inkjet head 1 according to the present embodiment is provided with the driving piezoelectric elements 21 disposed so as to be opposed to the pressure chambers 31, and these driving piezoelectric elements 21 are coupled so that the voltage can be applied thereto with the wiring lines. The control unit 150 transmits the drive signal to the driver IC according to the image data to apply the drive voltage to the internal electrodes 221, 222 of the piezoelectric elements 21 to selectively deform the piezoelectric elements 21. Then, the combination of the deformation in the tensile direction and the deformation in the compression direction of the vibrating plate 30 changes the volume of the pressure chamber 31, to thereby eject the liquid (ink).

For example, the control unit 150 alternately performs driving to cause tension actions and compression actions. In the inkjet head 1, when performing the tension action of increasing the volume of the pressure chamber 31 *t*, the driving piezoelectric element 21 is contracted while those piezoelectric elements 21 which are not the driving target are not deformed. Further, in the inkjet head 1, when performing the compression action of decreasing the volume of the pressure chamber 31, the piezoelectric element 21 is expanded. It should be noted that the non-driving piezoelectric elements 22 and the pillar elements 25 are not deformed in this process.

According to the inkjet head 1 and the inkjet recording device 100 described above, by providing the pillar elements 25 in the second area outer side of the first area where the piezoelectric elements 21, 22 are arranged, and then providing the alignment marks 351 through 356, 361 at the positions that will be opposed to the second area during assembly, it is possible to improve the bonding accuracy of the actuator unit 20 and the vibrating plate 30 to ultimately improve the driving efficiency and the printing accuracy associated with the inkjet head 1. Specifically, in a manufacturing process of a liquid ejection head, often several hundred or more pressure chambers are formed by bonding of the piezoelectric elements at the same time. When the number of pressure chambers or piezoelectric elements becomes large, and furthermore the piezoelectric elements become relatively long in length as compared to width, the proper alignment is particularly difficult. However, according to the embodiments described above, by detecting the positions of the pillar elements 25 and the alignment marks 351 through 356, 361 at both ends of the arranged piezoelectric elements 21 or the like, it is possible to better achieve the alignment of the plurality of piezoelectric elements 21 to the pressure chambers 31, and therefore, the device alignment accuracy can be improved. Further, by disposing the elements 25 used for performing the alignment areas other than where the pressure chambers are arranged, it is possible to obtain a structure permitting better alignment without affecting the active areas of the actuator(s) 20.

Further, in the inkjet head 1, by performing the alignment in two directions using the main marks 351 through 356 in the arrangement direction and the sub-marks 361 in the extending direction, it is possible to realize the alignment higher in accuracy.

Further, in the inkjet head 1, by providing the alignment element 2511 to be made to correspond to a space between the pair of alignment marks 351, 352 at the first area RA side, performing the highly accurate alignment, and keeping the alignment with respect to the other elements 2512, 2513 at the outer side within the extent that the gaps with the edges are adjusted to achieve a balance, it is possible to deal with when the processing accuracy of the components is high and when the processing accuracy thereof is low when performing the alignment at a plurality of places. In other words, the control unit 94 operates to move the element 2511 closer to the first area RA in a pair of alignment marks to perform the alignment with high accuracy or to adjust gaps formed between the pair of elements 2512, 2513 and the corresponding alignment marks to be the same in width or within an allowable range. By combining a plurality of levels of alignment accuracy with each other, it is possible to account for the processing accuracy and individual component differences.

Further, by arranging the elements for the alignment at positions which do not overlap the wiring films 71, the wiring operation and the alignment operation become easier.

Further, since the plurality of pillar elements 25 can be formed by performing groove processing at the same width as the grooves of the piezoelectric elements 21, 22, the workability and process flexibility is high.

Various modifications to above-described embodiments are possible and contemplated.

The specific configurations of the piezoelectric elements 21, 22 are not limited to those above. Similarly, the configurations of and the positional relationships of components including the flow channel member 40, the nozzle plate 50, and the frame unit 60 are not limited to the example described above, and may be changed as appropriate. For example, the manifold 405 may be formed of a single member or may also be formed by laminating two or more substrates.

Further, the specific positional relationships and arrangements of the pillar elements 25 and the alignment marks 351 through 356 are not limited to the embodiment described above. Nor is the relative positioning during alignment processing. For example, it is possible to dispose a single element between a pair of alignment marks or operate to only reduce the gap between a plurality of elements.

In one example, a plurality of pillar elements 25 is disposed at each of the both ends of a row, but this is not a limitation.

For example, in the configuration in which the nozzles 51 and the pressure chambers 31 are arranged in two or more rows, the pillar elements 25 and the alignment marks 351 through 356, 361 may be disposed at opposite ends at two places corresponding to diagonal positions of the arrangement area. In this case, the optical position detection may be achieved.

Further, in the embodiment described above, there is adopted the configuration in which the piezoelectric body layers are stacked on one another, and the piezoelectric elements 21 are driven using the longitudinal vibration (d33) in the stacking direction, but this is not a limitation. The present disclosure may be applied to, for example, an embodiment in which the driving piezoelectric elements 21 are each formed of a single layer piezoelectric member, and may also be applied to an embodiment in which the driving is by a transversal vibration (d31).

The arrangements of the nozzles 51 and the piezoelectric chambers 31 are not limited to the embodiment described above. For example, the nozzles 51 may be arranged in two or more rows. Further, air chambers as dummy chambers may be formed between pressure chambers 31.

Further, the liquid to be ejected is not limited to ink for printing, and it is possible to adopt, for example, a device for ejecting the liquid including conductive particles for forming wiring patterns on a printed wiring board.

Further, in the embodiment described above, there is shown the example in which the inkjet head 1 is used in the liquid ejection device such as the inkjet recording device, but this is not a limitation. The inkjet head 1 may be used in, for example, a 3D printer, an industrial manufacturing machine, for medical device purposes, and in each such case allows for reductions in device size, weight, and cost.

According to at least one of the embodiments described hereinabove, it is possible to easily set the desired flow channel shapes.

In addition, although some embodiments of the present disclosure are described, these embodiments are illustrative only, but it is not intended to limit the scope of the present disclosure. These novel embodiments can be implemented with other various aspects, and a variety of omissions, replacements, and modifications can be made within the scope or the spirit of the present disclosure. These embodiments and the modifications thereof are included in the scope of the disclosure, and at the same time, included in the disclosure set forth in the appended claims and the equivalents thereof.

What is claimed is:

1. A liquid ejection head, comprising:

a vibration plate;

a nozzle plate with a plurality of nozzles;

a plurality of pressure chambers spaced in a first direction, the plurality of pressure chambers being between the vibration plate and the nozzle plate and connected to the plurality of nozzles; and a piezoelectric member on a side of the vibration plate opposite of the pressure chambers, the piezoelectric member including:

a plurality of drive elements in a first area opposed to the plurality of pressure chambers via the vibration plate and configured to selectively vibrate the vibration plate to generate pressure changes in the plurality of pressure chambers, and a plurality of pillar elements in a second area outside the first area, the second area not being opposed to the plurality of pressure chambers via the vibration plate, wherein the vibration plate includes multiple alignment marks at positions opposed to the second area of the piezoelectric member, a first alignment mark of the multiple alignment marks extends lengthwise in a second direction perpendicular to the first direction and widthwise in the first direction, and a second alignment mark of the multiple alignment marks extends lengthwise in the first direction and widthwise in the second direction.

2. The liquid ejection head according to claim 1, wherein the second area is on both sides of the first area in the first direction, and the plurality of pillar elements are on both sides of the first area.

3. The liquid ejection head according to claim 2, wherein at least one alignment mark is opposed to the pillar elements on both sides of the first area.

4. The liquid ejection head according to claim 1, wherein the second alignment mark is proximate to an end of the first alignment mark.

5. The liquid ejection head according to claim 2, wherein at least one of the pillar elements is at a position opposed to an area between a pair of adjacent alignment marks in the multiple alignment marks.

6. The liquid ejection head according to claim 1, wherein the plurality of pillar elements includes a first alignment element, a second alignment element, and a third alignment element arranged in series along the first direction from the first area toward the second area, and the alignment marks including first through sixth main marks arranged in series along the first direction.

7. The liquid ejection head according to claim 6, wherein a distance between the first main mark and the second main mark is a first width, a distance between the second main mark and the third main mark is a second width, a distance between the third main mark and the fourth main mark is a third width, a distance between the fourth main mark and the fifth main mark is a fourth width, a distance between the fifth main mark and the sixth main mark is a fifth width, the first width, the third width, and the fifth width are equal to a width of a drive element in the first direction, the first alignment element opposes an area between the first main mark and the second main mark, an edge of the second alignment element is opposed to the third main mark, and an edge of the third alignment element is opposed to the sixth main mark.

8. The liquid ejection head according to claim 1, wherein the piezoelectric member includes wiring, and the pillar elements are at positions which do not overlap the wiring.

9. The liquid ejection head according to claim 1, wherein at least one of the multiple alignment marks is a through hole in the vibration plate.

10. The liquid ejection head according to claim 1, wherein at least one of the multiple alignment marks is a recess in the vibration plate.

11. The liquid ejection head according to claim 1, wherein the spacing between adjacent pillar elements is the same as the spacing between adjacent drive elements.

12. The liquid ejection head according to claim 11, wherein the plurality of drive elements includes driving element and non-driving elements alternating with each other in a first direction.

13. A liquid ejection head, comprising:

a vibration plate;

a nozzle plate with a plurality of nozzles;

a plurality of pressure chambers spaced from each other along a first direction, the plurality of pressure chambers being between the vibration plate and the nozzle plate, the plurality of pressure chambers being connected to the plurality of nozzles; and a piezoelectric member on a side of the vibration plate opposite of the pressure chambers, the piezoelectric member including:

a plurality of drive elements in a first area opposed to the plurality of pressure chambers via the vibration plate and configured to selectively vibrate the vibration plate to generate pressure changes in the plurality of pressure chambers, and a plurality of pillar elements in a second area outside the first area, the second area not being opposed to the plurality of pressure chambers via the vibration plate, wherein the vibration plate includes a plurality of alignment marks at positions opposed to the second area of the piezoelectric member, a first alignment mark extends lengthwise in a second direction perpendicular to the first direction and widthwise in the first direction, and a second alignment mark extends lengthwise in the first direction and widthwise in the second direction.

14. The liquid ejection head according to claim 13, wherein the second area is on both sides of the first area in the first direction, and the plurality of pillar elements are on both sides of the first area.

15. The liquid ejection head according to claim 13, wherein the second alignment mark is proximate to an end of the first alignment mark.

16. The liquid ejection head according to claim 13, wherein at least one of the pillar elements is at a position opposed to an area between a pair of adjacent alignment marks.

17. A liquid ejection apparatus, comprising:

a media conveyor; and a liquid ejection head positioned to eject liquid onto a medium on the media conveyor, the liquid ejection head including:

a vibration plate;

a nozzle plate with a plurality of nozzles;

a plurality of pressure chambers spaced in a first direction, the plurality of pressure chambers being between the vibration plate and the nozzle plate and connected to the plurality of nozzles; and a piezoelectric member on a side of the vibration plate opposite of the pressure chambers, the piezoelectric member including:

a plurality of drive elements in a first area opposed to the plurality of pressure chambers via the vibration plate and configured to selectively vibrate the vibration plate to generate pressure changes in the plurality of pressure chambers, and a plurality of pillar elements in a second area outside the first area, the second area not being opposed to the plurality of pressure chambers via the vibration plate, wherein the vibration plate includes multiple alignment marks at positions opposed to the second area of the piezoelectric member, a first alignment mark of the multiple alignment marks extends lengthwise in a second direction perpendicular to the first direction and widthwise in the first direction, and a second alignment mark of the multiple alignment marks extends lengthwise in the first direction and widthwise in the second direction.

18. The liquid ejection apparatus according to claim 17, wherein the second area is on both sides of the first area in the first direction, and the plurality of pillar elements are on both sides of the first area.

* * * * *